United States Patent

Buchesky et al.

[11] Patent Number: 5,327,655
[45] Date of Patent: Jul. 12, 1994

[54] METHOD AND APPARATUS FOR VEHICLE ALIGNMENT

[75] Inventors: David M. Buchesky, Troy; John Gray, Rochester Hills; Dara M. Tomczak, Royal Oak; Larry Rathgeb, West Bloomfield, all of Mich.

[73] Assignee: Chrysler Corporation, Highland Park, Mich.

[21] Appl. No.: 956,686

[22] Filed: Sep. 30, 1992

[51] Int. Cl.[5] .............................................. G01B 5/255
[52] U.S. Cl. ................................... 33/288; 33/203.15; 33/608
[58] Field of Search ............... 33/645, 288, 203.18, 33/203.19, 533, 608, 203.15, 203.16, 203.12

[56] References Cited

U.S. PATENT DOCUMENTS

| | | |
|---|---|---|
| 4,381,548 | 4/1983 | Grossman et al. ............. 33/288 X |
| 4,574,490 | 3/1986 | Curchod .................... 33/203.19 X |
| 4,782,559 | 11/1988 | Bergstrom .......................... 33/608 |
| 4,872,699 | 10/1989 | Grove et al. . |
| 4,918,821 | 4/1990 | Bjork ........................... 33/203.18 |
| 4,970,801 | 11/1990 | Specktor et al. . |
| 4,973,075 | 11/1990 | Rori et al. ....................... 280/661 |
| 5,056,233 | 10/1991 | Hechel et al. . |

Primary Examiner—William A. Cuchlinski, Jr.
Assistant Examiner—Alvin Wirthlin
Attorney, Agent, or Firm—Edward A. Craig

[57] ABSTRACT

A method and apparatus for aligning a vehicle having a frame, and a plurality of wheel hubs, and a suspension system operatively connecting the wheel hubs to the frame is provided. The method and apparatus provide sensors for sensing angular relationships between the wheel hubs and the frame in multiple suspension positions, and a computer connected to the sensors for calculating camber, castor and toe based upon the sensed angular relationship and for displaying whether camber, caster and toe are within preset ranges.

8 Claims, 4 Drawing Sheets

METHOD AND APPARATUS FOR VEHICLE ALIGNMENT

BACKGROUND OF THE INVENTION

1. Field of the Invention

The present invention relates generally to vehicles and, more particularly to, a method and apparatus for vehicle alignment.

2. Description of the Related Art

A vehicle such as an automotive vehicle must be aligned for proper handling of the vehicle and tire wear. The alignment parameters which are measured and adjusted include camber, caster and toe. Camber is defined as the angle which the wheel makes with respect to a vertical plane when looking at the wheel from either the front or rear of the vehicle. Caster is defined as the angle between the centerline of a typical steering knuckle and a vertical plane when looking at the wheel from the side of the vehicle. Toe is defined as the lateral distance between front edges of two wheels supported at opposite ends of a common axle and the rear edges of the wheels.

For proper vehicle alignment, camber, caster and toe need to be measured and adjusted throughout the suspension travel. Typically, the suspension travels through at least three suspension positions corresponding to design, jounce and rebound. Design position is defined as the distance between ground and bottom of the vehicle frame (e.g., a specified design position may be the distance when there is two passengers in the vehicle, a load in a trunk of the vehicle and a full tank of fuel in the fuel tank). Jounce position is defined as the distance between the wheel moved upwardly and the design position. Rebound position is defined as the distance between the wheel moved downwardly and the design position.

Conventionally, camber, caster and toe are adjusted at different work stations and at a single random height. Typically, a machine is required at each work station to perform the adjustments. As a result, there is no consistency in the vehicle alignment adjustments or settings from vehicle to vehicle. Further, these alignment parameters are not checked at its specified engineering design height before leaving the manufacturing plant. Therefore, a need exists in the art to adjust camber, caster and toe at one work station and for multiple suspension positions. Thus, a need exists to improve consistency in the vehicle alignment adjustments or settings from vehicle to vehicle before leaving the manufacturing plant.

SUMMARY OF THE INVENTION

It is, therefore, one object of the present invention to provide a method and apparatus for vehicle alignment.

It is another object of the present invention to provide a method and apparatus for vehicle alignment at one work station.

It is yet another object of the present invention to provide a method and apparatus for vehicle alignment at its specified engineering design height.

It is still another object of the present invention to provide a method and apparatus for vehicle alignment at multiple suspension positions.

It is a further object of the present invention to provide a method and apparatus for vehicle alignment which improves consistency or repeatability in vehicle alignment from vehicle to vehicle.

To achieve the foregoing objects, the present invention is an apparatus for aligning a vehicle having a frame, and a plurality of wheel hubs, and a suspension system operatively connecting the wheel hubs to the frame. The apparatus includes a support frame for supporting the vehicle, a plurality of positioner assemblies operatively connected to the support frame for moving corresponding wheel hubs of the vehicle to multiple suspension positions and sensors cooperating with the positioner assemblies for sensing angular relationships between the wheel hubs and the vehicle frame in the multiple suspension positions. The apparatus also includes a computer connected to the sensors for calculating vehicle alignment parameters such as camber, castor and toe based upon the sensed angular relationship and for displaying whether the vehicle alignment parameters such as camber, caster and toe are within preset ranges. The computer also calculates any shim changes required to ensure correct toe pattern.

Additionally, the present invention is a method of aligning a vehicle having a frame, a plurality of wheel hubs, and a suspension system operatively connecting the wheel hubs to the frame. The method includes the steps of supporting the vehicle frame upon a vehicle alignment apparatus having moveable positioner assemblies, mounting the positioner assemblies to the corresponding wheel hubs of the vehicle, and moving the positioner assemblies through multiple suspension positions. The method also includes the steps of sensing angular relationships between the wheel hubs and the vehicle frame by sensors in the multiple suspension positions, calculating vehicle alignment parameters such as camber, caster and toe by a computer based upon the sensed angular relationships, and displaying whether the vehicle alignment parameters such as camber, caster and toe are within preset ranges.

One advantage of the present invention is that a method and apparatus is provided which significantly improves four wheel vehicle alignment by measuring and setting the alignment throughout the suspension travel. Another advantage of the present invention is that the apparatus is a single machine that allows for adjustment or setting of camber, caster and toe at one work station and at one height which is the specified engineering design height of the vehicle. Yet another advantage of the present invention is that the apparatus is a single machine that allows for adjustment of camber, caster and toe in multiple suspension positions which include design, jounce and rebound. Still another advantage of the present invention is that the method checks and sets the vehicle alignment in multiple suspension positions. A further advantage of the present invention is that the method improves consistency or repeatability of adjustments for camber, caster and toe from vehicle to vehicle, especially before leaving the manufacturing plant, by repeatedly auditing the process instead of the vehicle. Still a further advantage of the present invention is that the method for vehicle alignment eliminates the need for any audit machinery.

Other objects, features and advantages of the present invention will be readily appreciated as the same becomes better understood after reading the following description taken in conjunction with the accompanying drawings.

DESCRIPTION OF THE PREFERRED EMBODIMENT(S)

Figure 1:
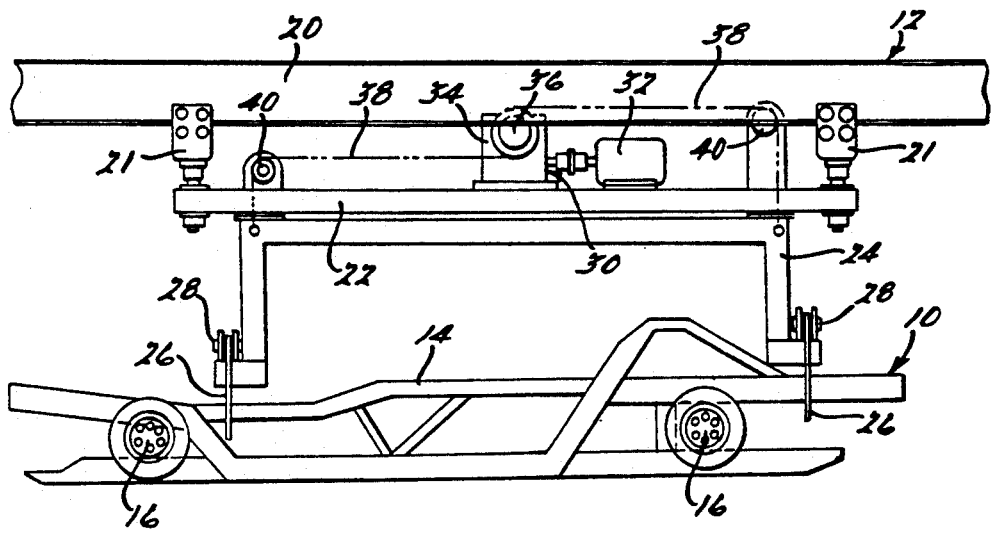
FIG. 1 is a side elevational view of a vehicle carried by a conveyor system prior to vehicle alignment according to the present invention.

Referring to FIG. 1, a vehicle 10 such as an automotive vehicle is illustrated in operational relationship with a conveyor system, generally indicated at 12, for moving the vehicle 10 along a predetermined path. The vehicle 10 includes a frame structure 14 and a plurality of wheel hubs or spindles 16 connected to the frame structure 14 by independent suspension assemblies 18 (FIG. 3) as is known in the art. It should be appreciated that the vehicle 10 includes a steering assembly (not shown) for steering a pair of opposed wheel hubs 16 as known in the art. It should also be appreciated that the vehicle 10 includes an engine, drive train, instrument panel assembly and wiring (not shown). It should further be appreciated that the vehicle 10 may include body panels (phantom lines FIG. 3). It should still further be appreciated that the vehicle 10 is conventional and known in the art.

Figure 2:
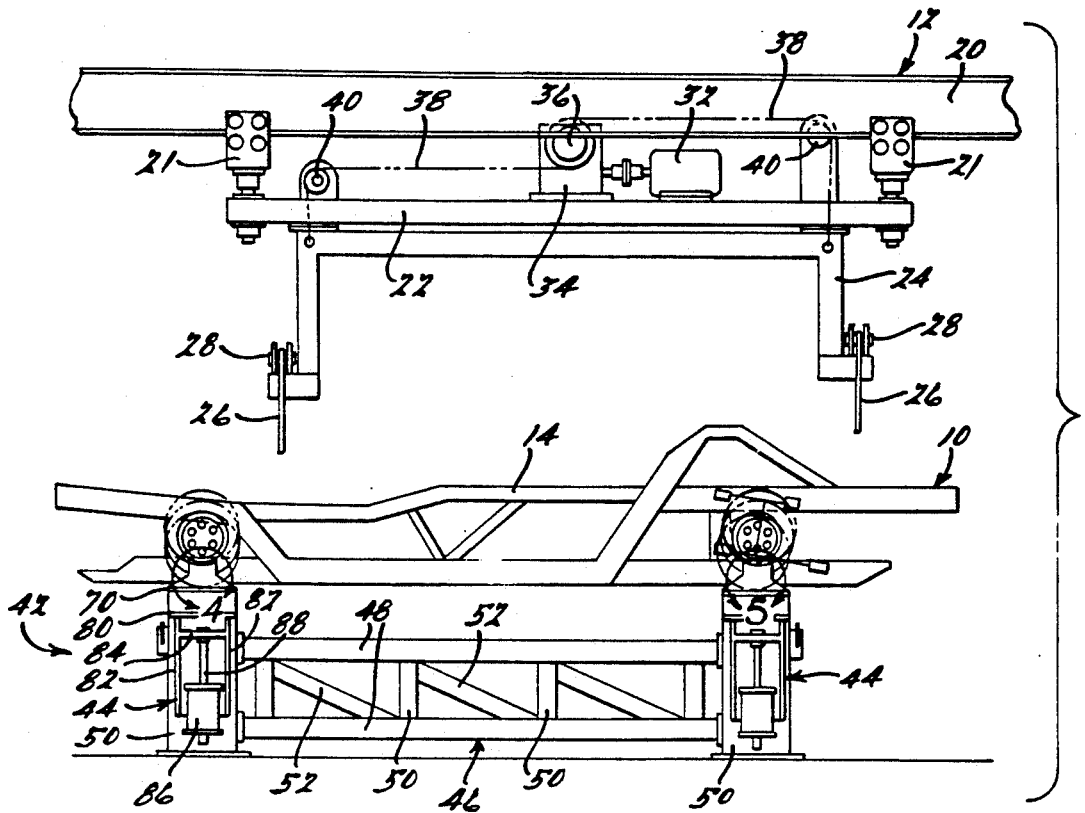
FIG. 2 is a side elevational view of the vehicle and conveyor system of FIG. 1 illustrated with the vehicle on a vehicle alignment apparatus according to the present invention.
Figure 6:
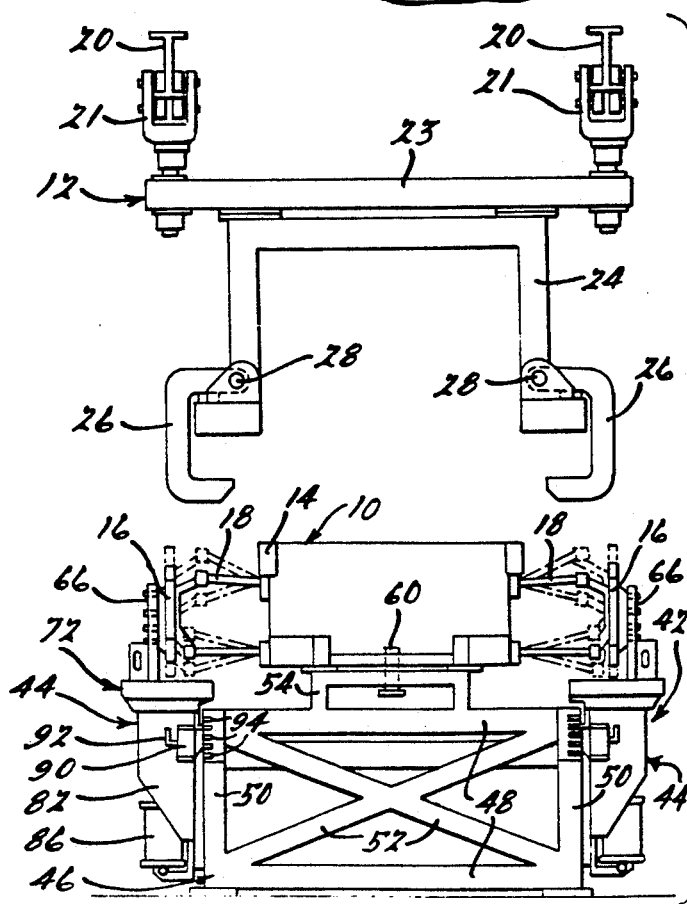
FIG. 6 is a front end elevational view of the vehicle and conveyor system and vehicle alignment apparatus of FIG. 2.

Referring to FIGS. 1, 2 and 6, the conveyor system 12 is a typical electrified overhead power and free conveyor system supported by a support structure (not shown). The conveyor system 12 includes at least one, preferably a pair of rails 20 and a plurality of trolleys 21 which move along the rails 20. The conveyor system 12 includes longitudinally and laterally extending support members 22 and 23, respectively, interconnecting the trolleys 21. It should be appreciated that the trolleys 21 and support members 22, 23 move together as a single unit along the rails 20.

The conveyor system 12 also includes at least one carrier 24 to support the vehicle 10 for movement along the rails 20. The carrier 24 has a generally inverted U-shaped configuration and includes a plurality of moveable members 26 pivotally connected at 28 to the carrier 24. The moveable members 26 are generally C-shaped and are pivoted laterally to engage and disengage the frame structure 14 of the vehicle 10. It should be appreciated that the pivotal connection 28 may be a shaft which extends through an oversized aperture in the moveable member 26 and supported between a pair of flanges secured to the carrier 24.

The conveyor system 12 further includes an elevator, generally indicated at 30, associated with each carrier 24 for moving the carrier 24 upwardly and downwardly relative to the rails 20. The elevator 30 includes a motor 32 interconnecting a transfer unit 34 and a source of electrical power (not shown). The transfer unit 34 includes a rotatable primary pulley 36. The elevator 30 also includes a cable 38 connected to the primary pulley 36 and extending over secondary pulleys 40 and connected to the carrier 24. Rotation of the motor 32 is transferred by the transfer unit 34 into rotation of the primary pulley 36 in either direction to extend or retract the cable 38 for moving the carrier 24 downwardly or upwardly relative to the rails 20. It should be appreciated that the conveyor system 12 is conventional and known in the art.

Figure 3:
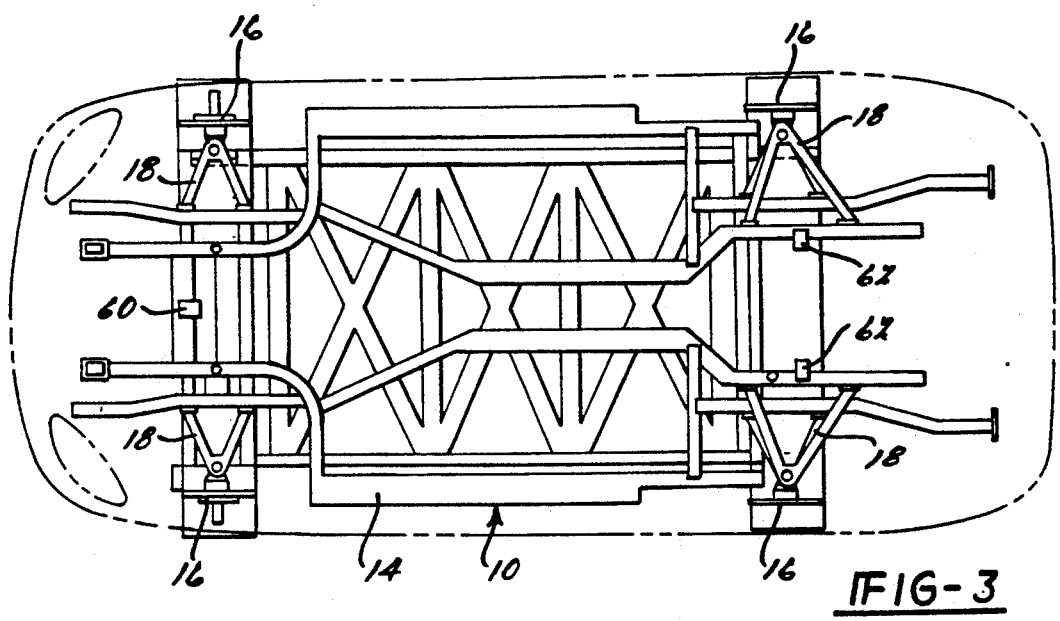
FIG. 3 is a plan view of the vehicle and vehicle alignment apparatus of FIG. 2.

Referring to FIGS. 2, 3, and 6, a multiposition vehicle alignment machine or apparatus, generally indicated at 42 and according to the present invention, measures and adjusts vehicle alignment parameters of the vehicle 10. The vehicle alignment apparatus 42 includes at least one, preferably a plurality of moveable positioner assemblies, generally indicated at 44, to be described. The vehicle alignment apparatus 42 also includes a support frame, generally indicated at 46, interconnecting the positioner assemblies 44. It should be appreciated that the support frame 46 is stationary and the positioner assemblies 44 move upwardly and downwardly relative to the support frame 46.

Figure 4:
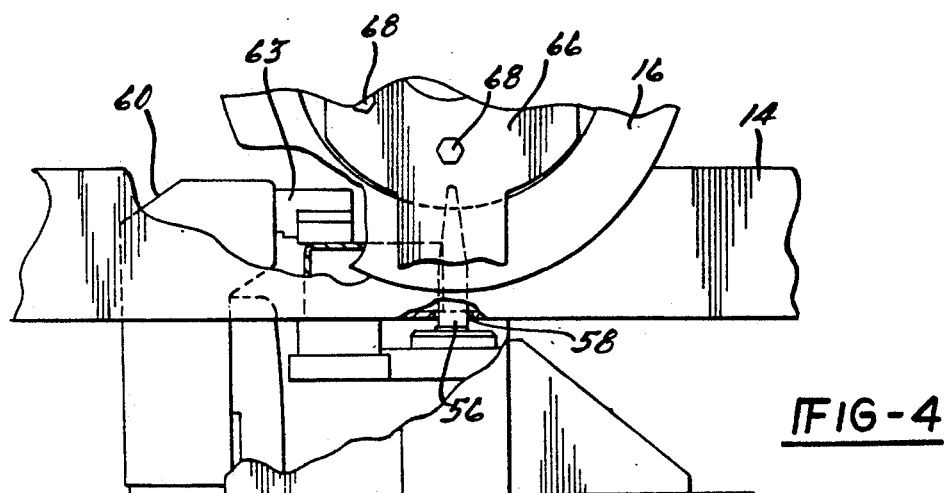
FIG. 4 is a partial enlarged elevational view of a portion of the vehicle and vehicle alignment apparatus in circle 4 of FIG. 2.
Figure 5:
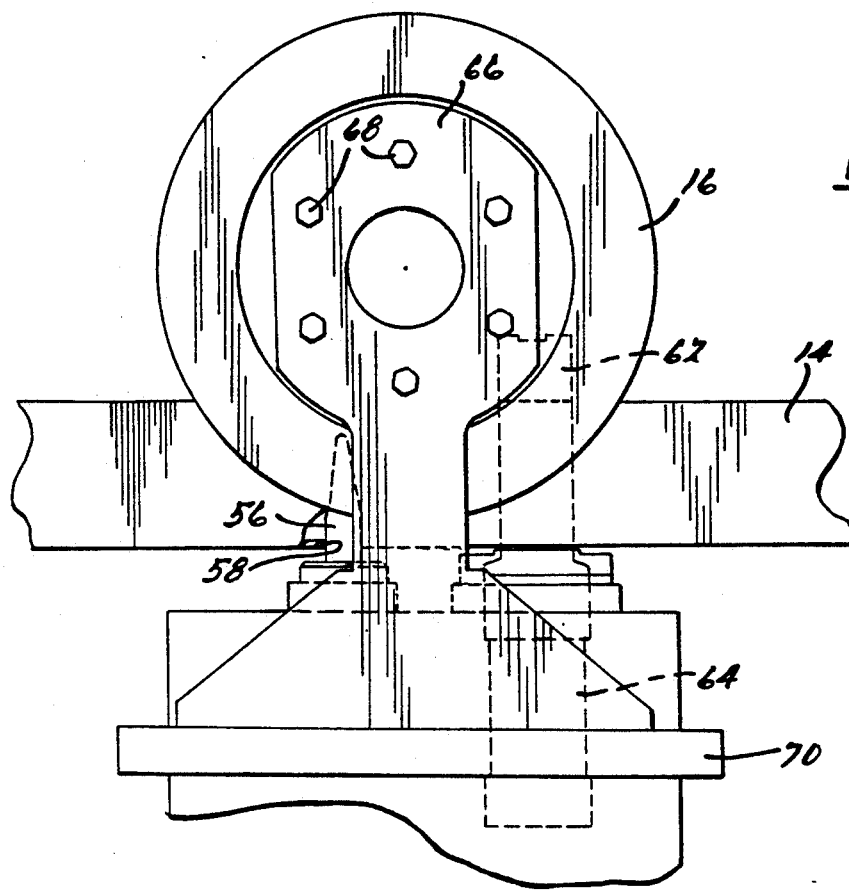
FIG. 5 is a partial enlarged elevational view of a portion of the vehicle and vehicle alignment apparatus in circle 5 of FIG. 2.

The support frame 46 includes a plurality of beams 48 interconnected by a plurality of columns 50 and inclined members 52. The beams 48, columns 50, and inclined members 52 are connected to each other by suitable means such as welding. The support frame 46 also includes at least one, preferably a plurality of rest pads 54 at each longitudinal end for supporting the frame structure 14 of the vehicle 10. The rest pads 54 are generally inverted U-shaped members secured by suitable means such as welding to upper beams 48. The support frame 46 includes at least one, preferably a plurality of projection or principal locators 56 (FIG. 4) secured by suitable means such as welding to the rest pads 54. The principal locators 56 extend through corresponding apertures 58 in the frame structure 14 of the vehicle 10. The principal locators 56 cooperate with the apertures 58 to locate the vehicle 10 relative to the vehicle alignment apparatus 42 and to serve as a datum for alignment settings. The support frame 46 further includes at least one, preferably a plurality of front and rear clamps 60 and 62, respectively, to clamp or secure the frame structure 14 of the vehicle 10 to the rest pads 54 of the support frame 46. The clamps 60, 62 include a moveable clamp member 63 (FIG. 4) connected to an actuator 64 (FIG. 4) such as a pneumatic cylinder. It should be appreciated that actuator 64 pivotally moves the clamp member 63 to engage and disengage the frame structure 14.

Figure 7:
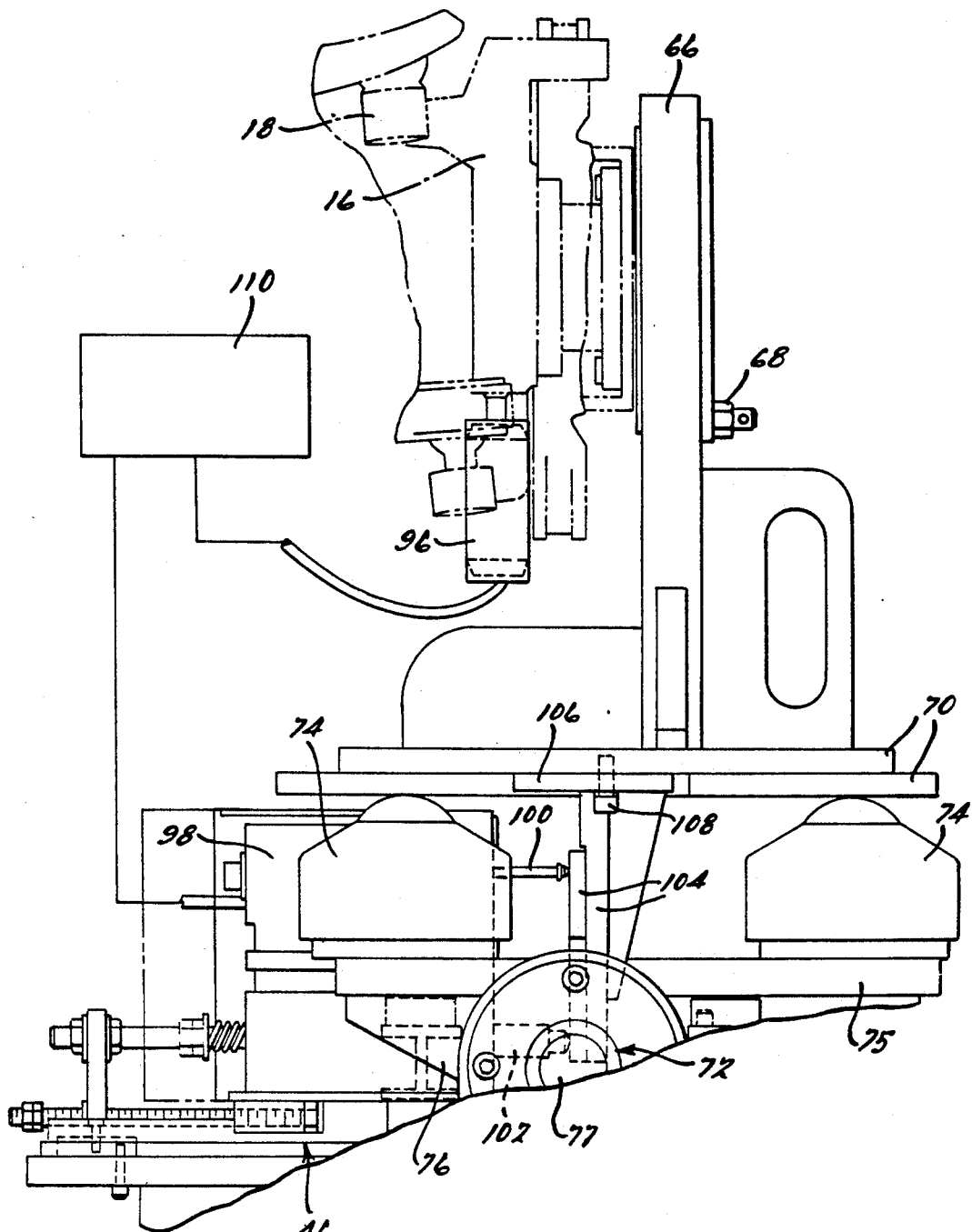
FIG. 7 is a side elevational view of the portion illustrated in FIG. 4.

Referring to FIGS. 2 through 7, each positioner assembly 44 includes a fixture or alignment head 66 which is removably secured by suitable means such as fasteners 68 to a corresponding wheel hub 16 of the vehicle 10. The alignment head 66 acts to simulate the actual wheel during the alignment process. The alignment head 66 is secured by suitable means such as welding to bearing plates 70. Each positioner assembly 44 also includes a trunnion, generally indicated at 72 in FIG. 4, and a plurality of bearing pins 74 to support the bearing plates 70 and allow the alignment head 66 to move freely through multiple suspension positions and a natural geometry locus of the suspension assemblies 18 of the vehicle 10. The middle bearing pin 74 (FIG. 4) is offset from the right and left bearing pins as shown in FIG. 7. The bearing pins 74 have one end contacting the bearing plates 70 and the other end secured by suitable means such as welding to a plate member 75. The plate member 75 is supported by a pair of laterally spaced flange members 76 secured to the plate member 75 by suitable means such as welding. The trunnion 72 includes a shaft 77 extending laterally through the flange members 76 such that the flange members 76 are journaled to the shaft 77. The shaft 77 is rotatably supported at each end thereof by journals 78 secured to a support plate 80 by suitable means such as welding. It should be appreciated that the trunnion 72 and bearing pins 74 allow the alignment head 66 to rotate or move laterally.

Each positioner assembly 44 also includes a pair of longitudinally spaced and generally vertical flange members 82 interconnected by a generally horizontal flange member 84. The upper ends of the vertical flange members 82 contact or support the trunnion 72. Each positioner assembly 44 also includes a cylinder 86 having one end connected to the support frame 46 and having a moveable piston (not shown) disposed therein. The cylinder 86 has a rod 88 connected at one end to the piston and the other end connected to the horizontal flange member 84. It should be appreciated that the cylinder 86 is connected to a source of pneumatic or air power (not shown). It should also be appreciated that the cylinder 86 extends or retracts the rod 88 to move the flange members 82, 84 upwardly and downwardly in response to air pressure.

Each positioner assembly 44 further includes an actuator mechanism 90 for allowing movement of the cylinder 86 upwardly and downwardly. The actuator mechanism 90 includes a pin 92 which cooperates with a plurality of slots or recesses 94. The recesses 94 are formed at predetermined intervals such as two (2) inches along the columns 50 adjacent each positioner assembly 44 corresponding to jounce, rebound and design suspension positions. It should be appreciated that the pin 92 is moved manually in and out of the recesses 94 by an operator. It should also be appreciated that the positioner assemblies 44 are moved independently of each other.

The vehicle alignment apparatus 42 also includes at least one, preferably a plurality of sensors 96, 98 for sensing angular relationships between the wheel hubs 16 and the frame structure 14 of the vehicle 10. A first sensor 96 is removeably secured by suitable means to the wheel hubs 16. Preferably, the first sensor 96 is an inclinometer which is used to sense and measure a vehicle alignment parameter such as caster. A second sensor 98 is secured by suitable means to the support frame 46 of the vehicle alignment apparatus 42. Preferably, the second sensor 98 has a pair of probes 100 and 102 which cooperate with vertically extending plates 104 secured by suitable means such as welding to a plate 106 which is, in turn, secured to the bearing plates 70 by suitable means such as fasteners 108. The second sensor 98 is used to sense and measure vehicle alignment parameters such as camber and toe.

The vehicle alignment apparatus 42 further includes a central processing unit or computer 110 connected to the sensors 96, 98. The computer 110 includes memory to store calibration data, vehicle alignment formulas and preset ranges of the vehicle alignment parameters for the vehicle 10 to be aligned. The computer 110 calculates vehicle alignment parameters according to the vehicle alignment formulas for the vehicle 10. The computer 110 also calculates the amount of shim required, if any, to ensure the correct front and rear toe patterns for the vehicle 10. The computer 110 also includes a monitor or display to display the vehicle alignment parameters and identify the out of specification vehicle alignment parameter to be adjusted by the operator at all three suspension positions and the amount of shim that may be required to bring the vehicle alignment parameters within the preset ranges.

In operation, the vehicle 10 is supported by the carrier 24 and moved by the conveyor system 12 as illustrated in FIG. 1. The conveyor system 12 moves the carrier 24 to an alignment work station above the vehicle alignment apparatus 42. The elevator 30 lowers the carrier 24 such that the principal locators 56 extend through the apertures 58 in the frame structure 14 of the vehicle 10 and rest the frame structure 14 on the rest pads 54. The moveable members 26 are pivoted outwardly and the carrier 24 releases the vehicle 10. The elevator 30 then raises the carrier 24 to move it above the vehicle alignment apparatus 42 as illustrated in FIG. 2.

Next, the actuators 64 are actuated to move the clamp members 63 of the clamps 60, 62 to engage the frame structure 14 and clamp the frame structure 14 to the rest pads 54. The operator then secures the alignment heads 66 to the wheel hubs 16 via the fasteners 68. The operator then locks the steering assembly (not shown) in place such that the wheel hubs 16 are parallel to a longitudinal axis of the vehicle 10. The operator attaches the first sensor 96 to the wheel hub 16. It should be appreciated that the sensors 96, 98 are calibrated prior to the actual alignment of the vehicle 10.

For vehicle alignment, the positioner assemblies 44 are set such that the wheel hubs 16 are in the design position. As a result, the sensors 96, 98 sense the angular relationship of camber, caster, and toe and transmit corresponding signals to the computer 110. The computer 110 calculates camber, caster and toe based on the sensed angular relationships to provide readings of the same. The computer 110 then displays the readings of camber, caster and toe and whether they are within or outside of the preset ranges and by the amount. The operator will, if necessary, turn predetermined members on the suspension assemblies 18 such that the readings are within preset ranges. It should be appreciated that either both front or rear wheel hubs 16 are adjusted at the same time.

Once camber, caster and toe are initially set in the design position, the operator moves the positioner assemblies 44 to the next suspension position. The operator moves the pin 92 out of the recess 94 and the positioner assembly 44 is moved upwardly to the jounce position. The operator then moves the pin 92 into the recess 94 corresponding to the jounce position. The cylinder 86 assists the upward movement, which is transferred through trunnion 72, bearing pins 74, bearing plates 70, and the alignment head 66 to move the wheel hub 16 to the jounce position. The sensors 96, 98 send signals to the computer 110 which calculates and displays readings of camber, caster, and toe in the jounce position.

Once camber, caster and toe are read by the computer 110 in the jounce position, the operator moves the positioner assemblies 44 to the next suspension position. The operator moves the pin 92 out of the recess 94 and the positioner assembly 44 is moved downwardly to the rebound position. The operator then moves the pin 92 into the recess 94 corresponding to the rebound position. Once again, the cylinder 86 assists the downward movement which is transferred through the trunnion 72, bearing pins 74, bearing plates 70 and alignment head 66 to move the wheel hub 16 to the rebound position. The sensors 96, 98 send signals to the computer 110 which calculates and displays readings of camber, caster and toe in the rebound position. At this time, the computer 110 displays any final out of specification vehicle alignment parameters and corresponding shim requirements to correct or bring them within the preset ranges. If shim changes are required, the operator makes the shim changes and then re-reads all three suspension positions and settings. It should be appreciated that the shim changes are made, preferably, in the design position and that the predetermined members may be adjusted in the other suspension positions.

After the vehicle 10 is aligned the clamps 60, 62 are released. The elevator 30 lowers the carrier 24 and the moveable members 26 are pivoted to engage the frame structure 14. The elevator 30 then raises the carrier 24 to lift the vehicle 10 off of the vehicle alignment apparatus 42.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An apparatus for aligning a vehicle having a frame, and a plurality of wheel hubs, and a suspension system operatively connecting the wheel hubs to the frame, comprising:
   a support frame for supporting a vehicle;
   a plurality of positioner assemblies operatively connected to said support frame for moving corresponding wheel hubs of the vehicle to multiple suspension positions;
   sensors cooperating with said positioner assemblies for sensing angular relationships between the wheel hubs and the vehicle frame in the multiple suspension positions;
   a computer connected to said sensors for calculating vehicle alignment parameters based upon the sensed angular relationship and for displaying whether the vehicle alignment parameters are within preset ranges;
   each of said positioner assemblies comprising an alignment head for securement to a corresponding wheel hub, and means for moving said alignment head through a natural geometry of the suspension system travel; and
   wherein said moving means comprises at least one bearing plate secured to said alignment head, a plurality of bearing pins to support said bearing plate, a trunnion cooperating with said bearing pins for allowing rotation of said bearing pins, bearing plate and alignment head, and a cylinder having a moveable piston and rod, one end of said cylinder being connected to said support frame and said rod being operative connected to said trunnion.

2. An apparatus as set forth in claim 1 including fastening means for removably securing said alignment head to the wheel hub.

3. An apparatus as set forth in claim 1 wherein said support frame includes rest means for resting the vehicle frame on said support frame.

4. An apparatus as set forth in claim 3 wherein said rest means comprises a plurality of rest pads secured to said support frame.

5. An apparatus as set forth in claim 1 including means for securing the vehicle frame to said support frame.

6. An apparatus as set forth in claim 1 including means for locating the vehicle frame relative to said support frame.

7. An apparatus as set forth in claim 6 wherein said locating means comprises a plurality of locators to extend through corresponding apertures in the vehicle frame.

8. An apparatus for aligning a vehicle having a frame, and a plurality of wheel hubs, and a suspension operatively connecting the wheel hubs to the frame, comprising:
   a support frame for supporting the vehicle frame;
   a plurality of locators to extend through corresponding apertures in the vehicle frame for locating the vehicle frame relative to said support frame;
   means for clamping the vehicle frame to said support frame;
   said support frame includes a plurality of rest pads for resting the vehicle frame on said support frame;
   a plurality of positioner assemblies operatively connected to said support frame for moving corresponding wheel hubs of the vehicle to multiple suspension positions;
   sensors cooperating with said positioner assemblies for sensing angular relationships between the wheel hubs and the vehicle frame in the multiple suspension positions;
   a computer connected to said sensors for calculating camber, castor and toe based upon the sensed angular relationship and for displaying whether camber, caster and toe are within preset ranges; and
   each of said positioner assemblies comprising an alignment head for securement to corresponding wheel hubs, bearing plates connected to said alignment head, a plurality of bearing pins supporting said bearing plates, and a trunnion operatively connected to said bearing pins for allowing rotation of said bearing pins, bearing plates and alignment head, a cylinder having a moveable piston and rod, one end of said cylinder being connected to said support frame and said rod being operatively connected to said trunnion.

* * * * *